United States Patent [19]
Kuipers et al.

[11] 4,315,954
[45] Feb. 16, 1982

[54] PROCESS FOR EXTRUDING A DIETARY FIBER SNACK PRODUCT

[75] Inventors: Arie Kuipers; Karl Schröder, both of Reitmehring, Fed. Rep. of Germany

[73] Assignee: Meggle Milchindustrie GmbH & Co. KG, Reitmehring, Fed. Rep. of Germany

[21] Appl. No.: 83,130

[22] Filed: Oct. 9, 1979

[30] Foreign Application Priority Data

Oct. 19, 1978 [DE] Fed. Rep. of Germany ....... 2845571

[51] Int. Cl.³ .............................................. A23L 1/164
[52] U.S. Cl. ................................... 426/583; 426/621; 426/656; 426/516; 426/804; 426/808
[58] Field of Search .............. 426/559, 560, 580, 583, 426/621, 625, 656, 804, 808, 445–450, 516, 637

[56] References Cited

U.S. PATENT DOCUMENTS

| | | | |
|---|---|---|---|
| 2,701,200 | 2/1955 | Huber | 426/559 |
| 3,851,081 | 11/1974 | Epstein | 426/559 |
| 3,865,959 | 2/1975 | Lecluse | 426/580 |
| 4,183,966 | 1/1980 | Mickle | 426/560 |

*Primary Examiner*—David M. Naff
*Assistant Examiner*—Elizabeth A. Hatcher
*Attorney, Agent, or Firm*—Sprung, Felfe, Horn, Lynch & Kramer

[57] ABSTRACT

A dietary snack product rich in fiber is produced by a process wherein a fiber containing substance which is difficult to extrude by itself is mixed with a protein such as milk protein plastifiable under extruding conditions, with the addition of water if desired, to form a mixture having a moisture content between 8 and 25%, and the obtained mixture is extruded at a temperature of at least 100° C. The resulting dietary product may contain 10 to 80% rich in fiber such as bran and 20 to 90% of plastifiable protein.

5 Claims, No Drawings

PROCESS FOR EXTRUDING A DIETARY FIBER SNACK PRODUCT

The invention relates to a snack product rich in ballast substance and a process for manufacturing it by extrusion at elevated temperature.

It is known that a diet rich in ballast substance is desirable and advantageous for the maintenance of a satisfactory functioning of the intestine. Generally, these digestion-promoting substances are understood to be ballast substances from plants, which consist largely of cellulose or of indigestible substances chemically related to cellulose. Since these indigestible ballast substances (called "dietary fiber" in English-language usage) are difficult to classify by ordinary chemical methods, the term "crude fiber" has been introduced, which generally amounts to approximately 1/5 of the vegetable ballast substances. Wheat bran, for example, contains, in addition to essential proteins, minerals and vitamins, between 20 and 60% of such ballast substances, corresponding to an average crude fiber content of 9 to 12%.

The nutritional-physiological value of vegetable ballast substances has in recent times been recognized, and it has been found that the supply of these ballast substances is too low in today's common diet. Accordingly, there is a demand for foods which are particularly rich in ballast substances to supplement the ordinary diet. Foods are considered to be especially rich in ballast substances if their crude fiber content exceeds a level of approximately 3%, based on the maximum level of the crude fiber content of agriculturally produced cereals.

According to what has been stated above, therefore, there is a need for food products which are rich in vegetable ballast substances, and which at the same time are of a flavor and consistency which appeal to the consumer.

Foods that are rich in crude fiber based on whole cereals are already known, such as crisp-bread, for example, but the selection of such foods is very limited and uninteresting. In particular, there are hardly any snack products rich in ballast substances available.

The term "snack products" used in connection with this invention is to be understood to mean products which are consumed mostly outside of the main meals of the day, e.g., at breakfast or at parties. They are foods to nibble or munch, in the form of flakes, foam products and the like, which may also be sweetened.

It is known that ballast substances can be added to snack products based on starchy materials, which are made by extruding processes, but their possible content of fiber components is very limited. This is due on the one hand to the poor extruding properties of starch products rich in crude fiber, and on the other hand to the fact that the materials rich in crude fiber are easily scorched under the temperature and pressure conditions employed in the extrusion process and are thus subject to thermal damage which makes the product unacceptable.

The invention, therefore, is addressed to the problem of eliminating the above-described difficulties and of creating a snack product rich in ballast substances, which will have considerably higher crude fiber contents than the known products and at the same time will have desirable characteristics of flavor and consistency.

This problem is solved in accordance with the invention by an extruded snack product rich in ballast substance, which is characterized by a content of 10 to 80 wt.-% of materials enriched with ballast substance and 20 to 90 wt.-% of a protein plastifiable under extruding conditions. Preferred are 20 to 70 wt.-% of the above-named ingredients rich in ballast substance. A product is considered to be rich in ballast substance if its crude fiber content is above 3% without including the plastifiable protein content in the calculation.

Surprisingly it has been found that proteins plastifiable under extruding conditions prevent the known disadvantages of the manufacture of crude fiber-rich snack products and make possible a substantial elevation of the crude fiber content without thereby adversely affecting the flavor characteristics and that, on the contrary, they yield a particularly flavorful product having a good consistency, which may be foamed if desired, and having good keeping qualities.

The materials rich in ballast substance which are contemplated in the scope of the invention are those which are physiologically acceptable. Examples are bran and other by-products of the processing of vegetable raw materials. Pure cellulose is also one of them.

The proteins which are plastifiable under extruding conditions are, in the scope of the invention, those which on the one hand plastify at the extrusion temperatures of over 100° C. to such an extent that they act as lubricants for the ballast substance content, and on the other hand are suitable for foods as regards flavor. Especially suitable are milk proteins, such as casein, coprecipitate and whey protein, but also vegetable proteins. It is especially advantageous if they have been beneficiated with additives, i.e., made more fusible or soluble.

The snack in accordance with the invention has a firm, crisp structure and, despite the high crude fiber content, it has a good, acceptable flavor. The consistency can be modified as desired within a very broad range. The crisp, brittle consistency corresponds approximately to that of crisp-bread.

In addition to ballast substance and protein, the snack product of the invention can contain still other foods or food components, such as carbohydrates and fats, salts, spices, aromatic agents and coloring additives, and vitamins if desired, in the amounts commonly used in foods. It is therefore suitable as a superior main meal-time food. Important to the invention is the observation of the ballast substance and plastifiable protein contents set forth in the principal claim, it being easily possible to determine by experiment the amounts to be used in the individual case.

The process of the invention for the manufacture of the new snack product by extrusion is characterized by the fact that a material rich in ballast substance, which in itself is difficult to extrude, is mixed with a protein plastifiable under extruding conditions with a moisture content of 8 to 25 wt.-%, and the mixture obtained is extruded at a temperature of at least 100° C.

The proteins and the crude fiber materials, especially the cellulose fiber materials, which are usable in the framework of the process of the invention, have already been mentioned above. Important to the process is mainly also the temperature, which ranges preferably from 120° to 190° C., and also the moisture content prior to extrusion, which is important to the achievement of the desired crisp structure. Preferably the moisture content amounts to 10 to 20 wt.-%.

It is important for the process that the protein to serve as coating and lubricant has in the extruding process a moisture content which assures optimum melting properties under the extruding conditions.

This is achieved in various ways. The protein can be mixed in relatively moist form, for example over 10%, with the usually drier ballast substance and then can be extruded immediately thereafter. On the other hand, a drier protein (between 6 and 12% moisture content in the case of casein, for example) can be mixed with relatively moist ballast substance, or water can be added to the total mixture, in which case the mixture is allowed to mature until the lubricant protein has absorbed sufficient moisture.

In general, these conditions are met in the moisture content range of the extruding mixture as set forth.

If a beneficiation of the protein is to be performed, the fusible protein can be put into the process in the form of already beneficiated protein, for example in the form of sodium caseinate or potassium caseinate, which in turn can be produced from acid casein. Alternatively, however, it is also possible to perform the beneficiation of the protein in situ, i.e., simultaneously with the manufacture of the snack product. In this case non-beneficiated protein is used together with beneficiating agents. Beneficiating agents can be alkalies or alkalinely reacting salts, especially the alkali, alkaline earth or/and ammonium salts of carboxylic acid, phosphoric acid, citric acid or other weak inorganic or organic acids, especially those having complexing anions, such as for example the citrates, oligophosphates and polyphosphates and the like. The desired conversion of the protein is brought about by the beneficiating agents during the extrusion, thus forming beneficiated protein. For the beneficiation of rennet casein, salts with complexing anions are preferred which are capable of binding calcium.

In spite of the high temperatures which can be used in the process of the invention, surprisingly neither the protein nor the crude fiber-containing material is undesirably discolored. It is assumed that, under the pressure and temperature conditions of the extrusion, an enveloping by the protein of the component containing the ballast substance takes place, preventing undesirable discoloration and the occurrence of disadvantageous flavor alterations. It was particularly surprising that it was possible with relatively small amounts of protein to make the crude fiber materials extrudable, even though very high contents are needed in order to make crude fiber material extrudable to any degree when starchy products with their known good glutenization properties and hence lubricant properties are used. At the same time the lubricating action of the protein is sustained all the way down to the lowermost temperature limit of the process of the invention, although below 120° C. the amount of protein should no longer be at the minimum.

Through the selection of the composition, especially with regard to the protein content and the moisture content of the starting product that is to be extruded and the temperature in the extruder, it is possible to control the consistency and especially the density of the product within wide limits. The flavor and nutritional qualities of the product can be varied by the addition of conventional flavoring and scenting substances, including sodium chloride, and also vitamins if desired.

Even heat-sensitive proteins can be used without harm due to the possibility of extruding even at relatively low temperatures.

The snack product rich in ballast substance in accordance with the invention augments the supply of crude fiber-rich foods, especially those having a digestion-regulating action. As a result of the protein content, it simultaneously constitutes a valuable source of nutrition which is willingly consumed due to its tastiness.

The following examples further explain the invention. The percentages given are related to the weight.

EXAMPLE 1

A mixture was prepared from 700 grams of wheat bran having an 11% crude fiber content and an 8.3% moisture content and 300 grams of finely granulated acid casein with a moisture content ranging between 6 and 10%, which has previously been mixed with a sodium carbonate solution in such amount that the final moisture content was 16% and the pH 6.3. The mixture was placed in a food extruder with a slot, which is heatable in three different zones and has a progressive-core screw, and extruded. The temperature in the first zone was 100° C., and in the second and third zone 170° C. The compression ratio was 1:4. A solid snack product was obtained having a weight of 300 grams per liter.

EXAMPLE 2

Example 1 was repeated, but the wheat bran content was 60% and the acid casein content 40%. The weight of the product obtained was 280 grams per liter.

The process was repeated using 50, 40 and 30% bran with a correspondingly higher content of acid casein. The bulk weights were 270 grams, 190 grams and 130 grams per liter, respectively.

When potassium carbonate was used instead of sodium carbonate in Examples 1 and 2, similar products were obtained. A suspension of bicarbonate in water also proved to be suitable.

EXAMPLE 3 (Comparison)

Example 2 was repeated using corn grits with a moisture content of 16.0% instead of casein. The mixture was not extrudable in any of the quantity ratios of Example 2. Not until the bran content was reduced to less than 20% was satisfactory extrusion possible.

EXAMPLE 4

Equal weight-parts of wheat bran and potassium caseinate were thoroughly mixed and the moisture content was adjusted to 16%. Then the extruding was performed using the extruder described in Example 1. The temperature in the first zone was 100° C., and in the second and third zone 120° C. The product had a bulk weight of 590 g per liter. It had a crisp, brittle structure and a flavor similar to crisp-bread.

The process was repeated using a temperature of 150° C. in the second and third zone. The bulk weight was 310 g per liter.

Another repetition at 190° C. resulted in a bulk weight of 270 grams per liter. The structural and flavor characteristics were the same as those of the product obtained at 120° C.

EXAMPLE 5

Example 4 was repeated using 60 wt.-% of potassium caseinate and 40 wt.-% of wheat bran in the mixture. The results at various extrusion temperatures were the same as those of Example 4.

EXAMPLE 6

Example 5 was repeated, but using sodium caseinate instead of potassium caseinate. The results were similar to those of Example 5.

EXAMPLE 7

Example 2 was repeated using various amounts of potato fiber and sodium caseinate. The potato fiber product was a residual product of the production of starch from potatoes. The potato fiber content was varied from 30 to 70 wt.-%, and the temperatures in zones 2 and 3 were varied from 120° to 180° C. In each case, satisfactory products resulted. The bulk weights were between 100 and 700 grams per liter.

EXAMPLE 8

The following product was extruded at 180° C. in a food extruder having a progressive core (compression ratio 1:4).

Acid casein of a grain size of 0.6 mm and a moisture content of 9.4 % was mixed dry in a 1:1 ratio with a cellulose powder Type EP 70 of the firm of Celcommerz. (Crude fiber content 98%).

A 14.6% potassium carbonate solution was uniformly sprayed on this mixture under strong turbulence at the rate of 113 g per kilogram.

The moisture content of the mixture was 16%.

The extruding was performed after this moistened mixture has been standing for about 20 hours. The result was a light yellow snack food having a bulk weight of 398 grams per liter. The pH of the extrudate was 6.5.

We claim:

1. Process for the manufacture of an extruded dietary fiber snack product containing 10% to 80% dietary fiber and 20% to 90% of a protein plastifiable under extruding conditions, comprising the steps of mixing the dietary fiber, which by itself is difficult to extrude, with a protein that is plastifiable under extruding conditions, the plastifiable protein being formed of a non-beneficiated protein and a beneficiating agent selected from an alkali, alkaline-earth or ammonium compound of carboxylic acid, phosphoric acid, or citric acid, or a corresponding hydroxide; or a mixture of a complexing acid with alkalinely reacting salts, adjusting the mixture to a moisture content between 8% and 25%; and, thereafter, extruding the mixture at a temperature of at least 100° C. to form the product.

2. Process of claim 1, wherein the extruding is done at a temperature in the range from 120° to 190° C.

3. Process of claim 1 wherein the mixture has a moisture content of 10 to 20% when extruded.

4. Process of claim 1 wherein rennet casein, coprecipitate or/and whey protein is used as the beneficiable protein.

5. An extruded snack product prepared by the process of claim 1.

* * * * *